(12) United States Patent
Sakaguchi et al.

(10) Patent No.: US 10,702,809 B2
(45) Date of Patent: Jul. 7, 2020

(54) CYLINDRICAL FILTRATION FILTER

(71) Applicants: Kabushiki Kaisha Toyota Jidoshokki, Aichi (JP); Toyo Screen Kogyo Co., Ltd., Nara (JP)

(72) Inventors: Hidekatsu Sakaguchi, Aichi (JP); Yasuhito Matoba, Nara (JP)

(73) Assignee: KABUSHIKI KAISHA TOYOTA JIDOSHOKKI, Ikaruga-Cho, Ikoma-Gun Nara (JP)

( * ) Notice: Subject to any disclaimer, the term of this patent is extended or adjusted under 35 U.S.C. 154(b) by 153 days.

(21) Appl. No.: 16/108,423

(22) Filed: Aug. 22, 2018

(65) Prior Publication Data

US 2019/0060800 A1    Feb. 28, 2019

(30) Foreign Application Priority Data

Aug. 28, 2017  (JP) .................................. 2017-163274

(51) Int. Cl.
| | |
|---|---|
| *B01D 33/06* | (2006.01) |
| *B01D 24/46* | (2006.01) |
| *B01D 33/58* | (2006.01) |
| *B23Q 11/00* | (2006.01) |
| *B23Q 11/10* | (2006.01) |
| *B01D 33/073* | (2006.01) |
| *B01D 33/067* | (2006.01) |
| *B01D 33/50* | (2006.01) |

(52) U.S. Cl.
CPC ............. *B01D 33/06* (2013.01); *B01D 24/46* (2013.01); *B01D 33/067* (2013.01); *B01D 33/073* (2013.01); *B01D 33/50* (2013.01); *B01D 33/58* (2013.01); *B23Q 11/0042* (2013.01); *B23Q 11/1069* (2013.01)

(58) Field of Classification Search
CPC ...... B01D 29/012; B01D 39/10; B01D 24/46; B01D 33/06; B01D 33/067; B23Q 11/1069
See application file for complete search history.

(56) References Cited

U.S. PATENT DOCUMENTS 3,140,283 A * 7/1964 Depoorter ............. C07F 9/5352
546/23
4,038,187 A * 7/1977 Saffran ................ B01D 33/067
210/108

(Continued)

FOREIGN PATENT DOCUMENTS

JP    2000-350906    12/2000
JP    2012-196747    10/2012

*Primary Examiner* — Ana M Fortuna
(74) *Attorney, Agent, or Firm* — Kirschstein, Israel, Schiffmiller & Pieroni (57) ABSTRACT

A cylindrical filtration filter includes a cylindrical filter main body. The filter main body is constituted by at least two split filters. Each of the split filters has an arc shape in cross section. Each of the split filters includes a filter element for filtration and side frame bodies provided along side portions of the filter element. The side frame body of one of the two split filters adjacent to each other includes a first facing surface having an uneven shape. The side frame body of the other split filter includes a second facing surface having an uneven shape complementary to the first facing surface. The first facing surface and the second facing surface are fitted to each other when the filter main body is assembled.

5 Claims, 8 Drawing Sheets (56) References Cited

U.S. PATENT DOCUMENTS

| | | | | |
|---|---|---|---|---|
| 5,218,205 A | * | 6/1993 | Lange | H04N 1/0281 |
| | | | | 250/585 |
| 2014/0158608 A1 | * | 6/2014 | Pranger | B01D 35/02 |
| | | | | 210/446 |
| 2014/0291237 A1 | * | 10/2014 | Fulara | B07B 1/12 |
| | | | | 210/497.01 |
| 2017/0325605 A1 | * | 11/2017 | Korn | A47G 5/02 |

* cited by examiner

CYLINDRICAL FILTRATION FILTER

INCORPORATION BY REFERENCE

This application is based on Japanese Patent Application Serial No. 2017-163274 filed in the Japan Patent Office on Aug. 28, 2017, the contents of which are fully incorporated herein by reference.

BACKGROUND

The present disclosure relates to a cylindrical filtration filter that has a filter main body constituted by a plurality of split filters.

Cylindrical filtration filters are used in various industrial fields including cutting. The cylindrical filtration filter disclosed in Japanese Unexamined Patent Application Publication No. 2012-196747 is incorporated in a cutting oil filtration device. The cutting oil filtration device filtrates already used cutting oil containing chips by using the cylindrical filtration filter to remove the chips from the cutting oil, thereby making the cutting oil reusable.

Publication of Japanese Patent No. 3774083 discloses a cylindrical filtration filter constituted by two or more split filters each having an arc shape in cross section. This split structure facilitates attachment and detachment of the cylindrical filtration filter. Furthermore, the cylindrical filtration filter is economical because the split filter that includes no damaged part does not have to be replaced in the event of damage to the cylindrical filtration filter.

What should be noted about this split structure is the sealability between the split filters. It is necessary to prevent an undiluted solution from entering the cylindrical filtration filter through the space between the split filters without being filtrated.

SUMMARY

According to one aspect of the disclosure, there is provided a cylindrical filtration filter. The cylindrical filtration filter includes a cylindrical filter main body. The filter main body is constituted by at least two split filters. Each of the at least two split filters has an arc shape in cross section. Each of the at least two split filters includes a filter element for filtration and side frame bodies provided along side portions of the filter element. The side frame body of one of two split filters adjacent to each other among the at least two split filters includes a first facing surface having an uneven shape. The side frame body of the other of the two split filters includes a second facing surface having an uneven shape complementary to the first facing surface. The first facing surface and the second facing surface are fitted to each other when the filter main body is assembled.

The above and other features, aspects and advantages of the present disclosure will become apparent and more readily appreciated from the following detailed description of the embodiments, taken in conjunction with the accompanying drawings.

DESCRIPTION OF THE EMBODIMENTS

The embodiments will now be described with reference to the accompanying drawings, wherein like reference numerals designate corresponding or identical elements throughout the various drawings.

In an embodiment described below, a cylindrical filtration filter is incorporated in a cutting oil filtration device and used for filtrating already used cutting oil containing chips to remove the chips from the cutting oil.

Figure 1:
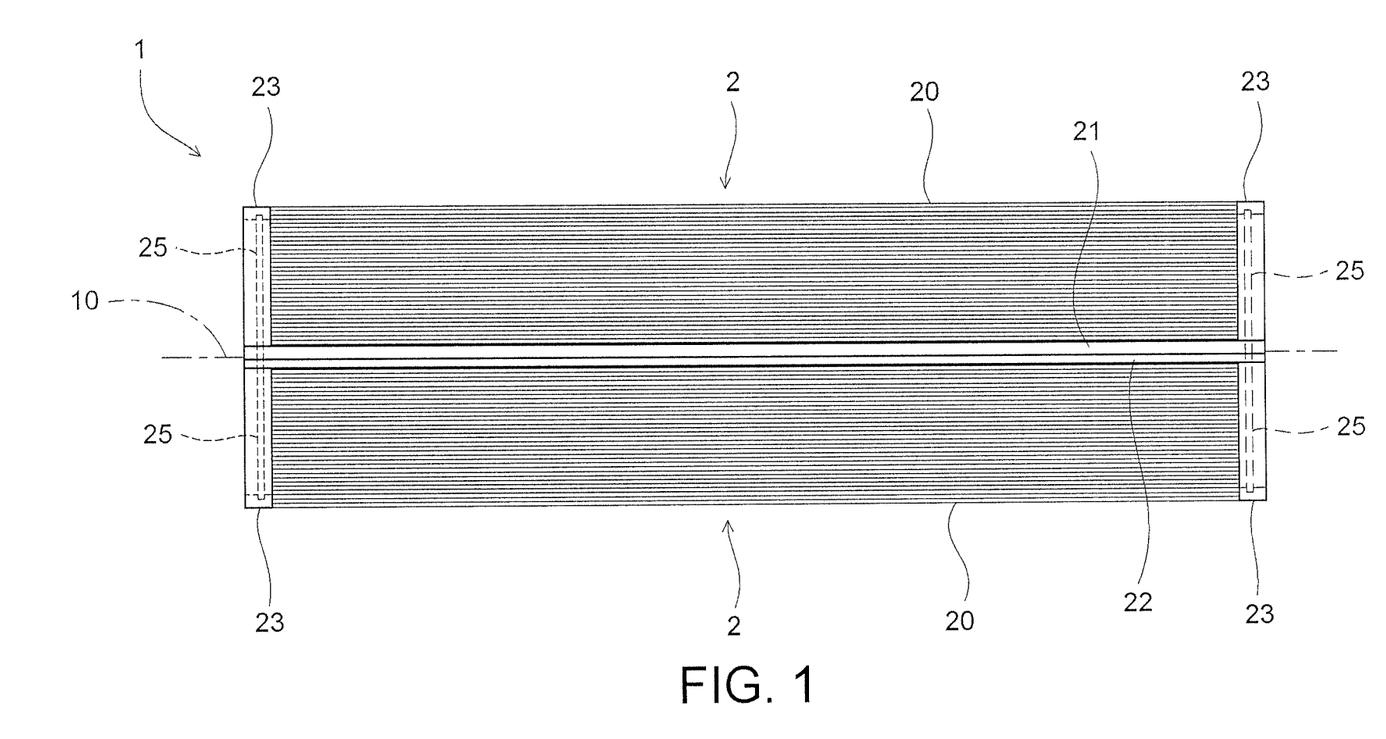
FIG. 1 is a front view illustrating a filter main body of a cylindrical filtration filter according to an embodiment of the disclosure.

Referring to FIG. 1, the cylindrical filtration filter includes a cylindrical filter main body 1 that has a central axis 10. In this embodiment, the filter main body 1 includes two split filters 2 each having a semicircular arc shape in cross section. The two split filters 2 constitute the filter main body 1.

Each of the split filters 2 includes a filter element 20 for filtration having a semicircular arc shape in cross section. In addition, each of the split filters 2 includes linear side frame bodies 21 and 22 provided along both side portions of the filter element 20 and semicircular arc-shaped end frame bodies 23 provided along both end portions of the filter element 20.

Figure 2A:
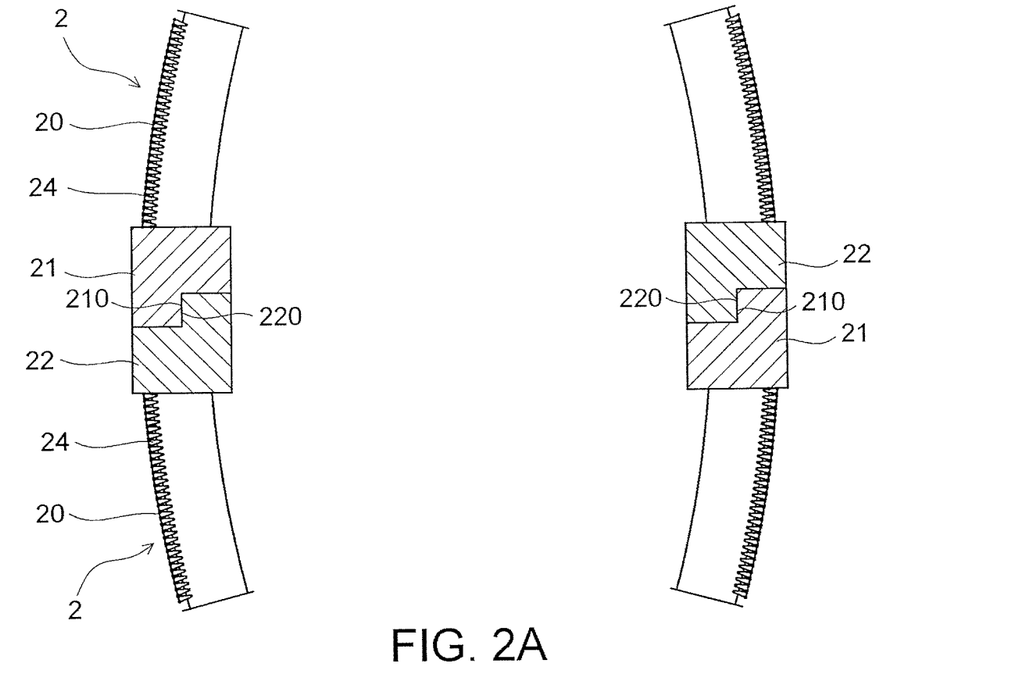
FIG. 2A is a cross-sectional view of a split structure of the filter main body illustrated in FIG. 1.

FIG. 2A is a cross-sectional view of a part including the side frame bodies 21 and 22 of the split filters 2 illustrated in FIG. 1. In this embodiment, each of the filter elements 20 is a wire screen, more specifically a wedge wire screen. Each of the filter elements 20 includes a plurality of wires 24 arranged in an arc shape at a predetermined interval and extending in parallel to each other. Each of the wires 24 is a wedge wire having a wedge shape in cross section. Each of the filter elements 20 is configured to have an outside surface serving as a primary side surface and an inside surface serving as a secondary side surface.

The side frame bodies of the split filter 2 are divided into the first side frame body 21 and the second side frame body 22. In the embodiment, each of the split filters 2 includes the first side frame body 21 extending along one side portion and the second side frame body 22 extending along the other side portion. The first side frame body 21 of one split filter 2 and the second side frame body 22 of the other split filter 2 face each other.

Figure 2B:
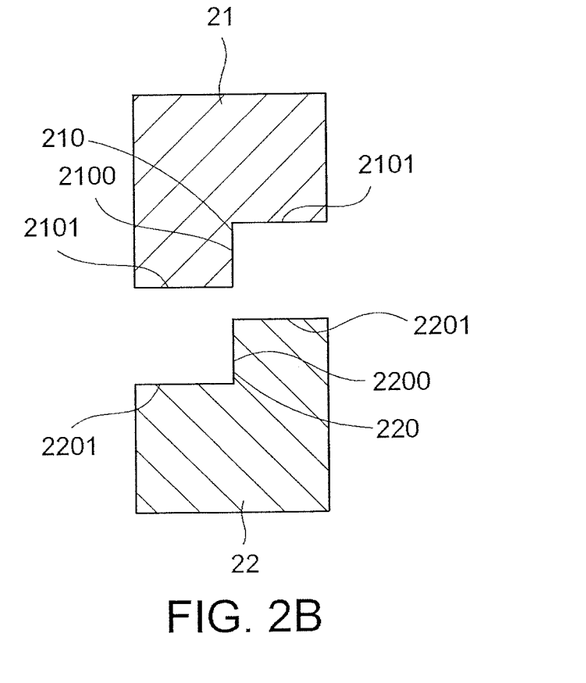
FIG. 2B is a cross-sectional view of first and second side frame bodies of split filters.

Referring to FIG. 2B, the first side frame body 21 of the split filter 2 includes a first facing surface 210 having an uneven shape and facing the second side frame body 22 of the adjacent split filter 2. The first facing surface 210 of the split filter 2 includes the inward facing surface part 2100 facing the inside of the split filter 2 and the two perpendicular surface parts 2101 continuous to the inward facing surface part 2100 and perpendicular to the inward facing surface part 2100.

The second side frame body 22 of the split filter 2 includes a second facing surface 220 facing the first side frame body 21 of the adjacent split filter 2. The second facing surface 220 has an uneven shape complementary to the first facing surface 210. In other words, the second facing surface 220 of the split filter 2 includes the outward facing surface part 2200 facing the outside of the split filter 2 and the two perpendicular surface parts 2201 continuous to the outward facing surface part 2200 and perpendicular to the outward facing surface part 2200.

Referring back to FIG. 1, each of the end frame bodies 23 includes a semicircular arc-shaped recessed groove 25 formed in the inner peripheral surface thereof. The recessed grooves 25 are used for attachment of the filter main body 1 to a cutting oil filtration device 4 illustrated in FIG. 3.

Figure 6A:
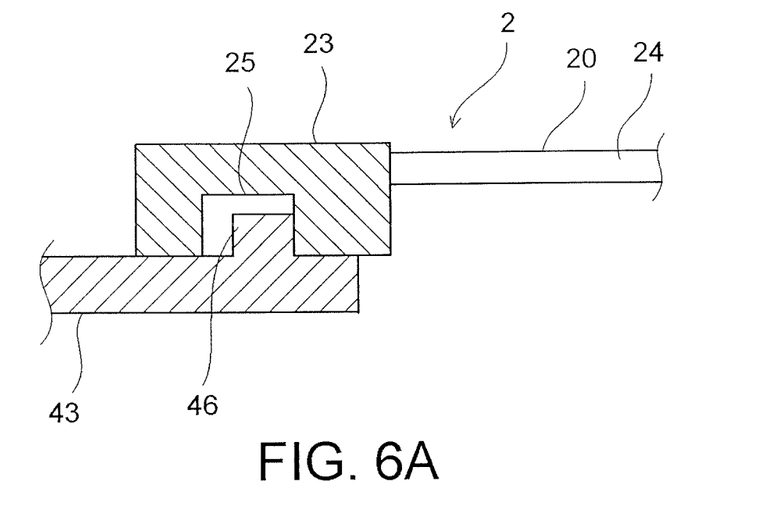
FIGS. 6A and 6B are diagrams illustrating filter main body assembly and attachment.
Figure 6B:
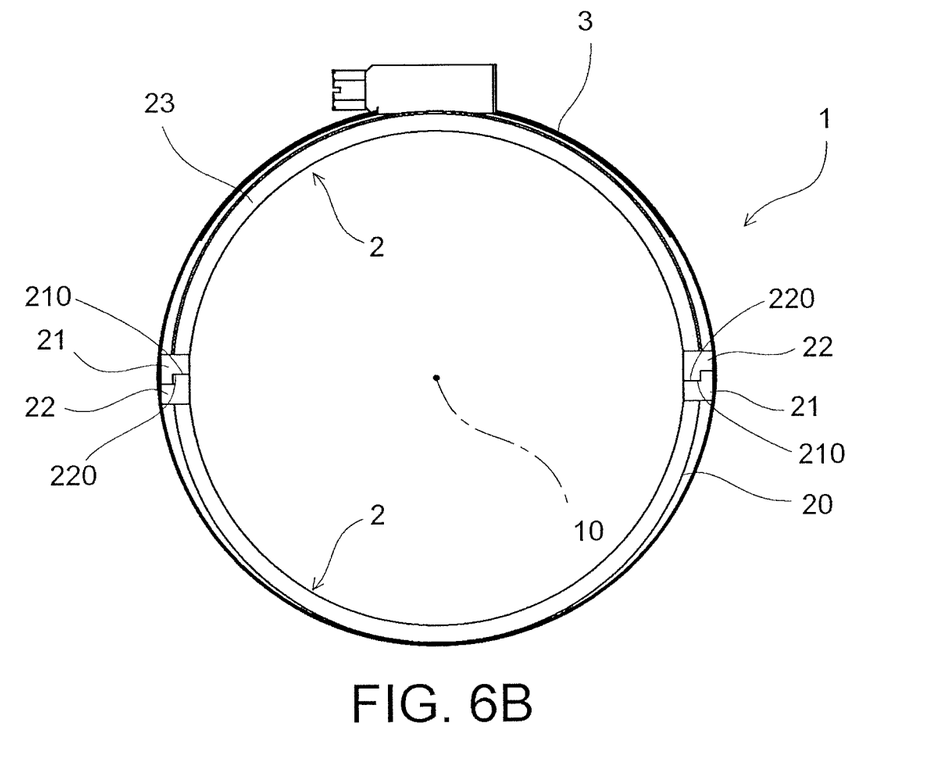

As illustrated in FIG. 6B, the cylindrical filtration filter further includes at least one fastener 3 fastening the filter main body 1. In this embodiment, two fasteners 3 (one of which is not illustrated) are provided over the outer periphery of the filter main body 1 at both end portions of the filter main body 1 (the end frame bodies 23 of the split filters 2). In this embodiment, each of the fasteners 3 is a hose band.

Figure 3:
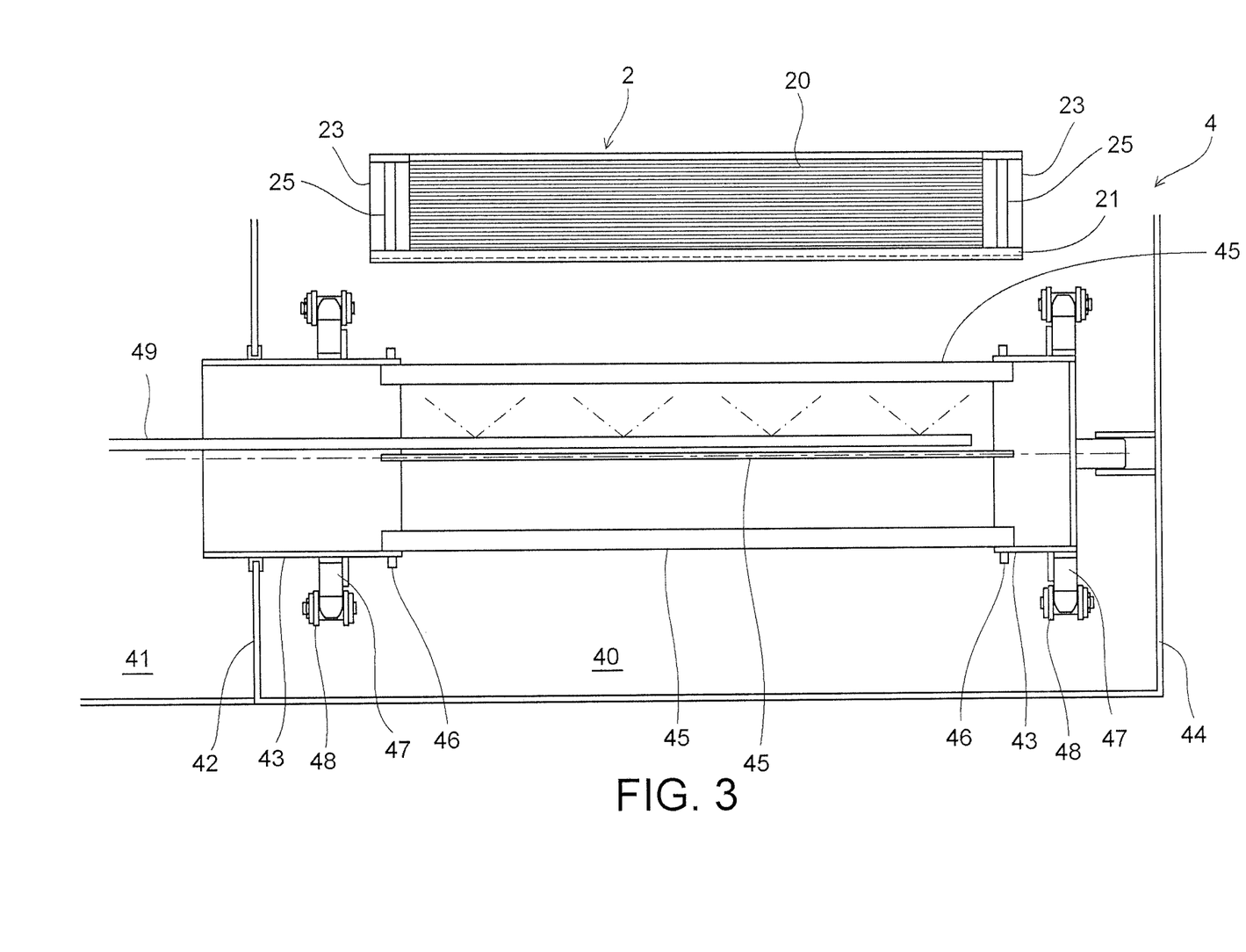
FIG. 3 is a schematic diagram of a cutting oil filtration device.

As illustrated in FIG. 3, the cutting oil filtration device 4 includes an undiluted solution tank 40 to which already used cutting oil (an example of an undiluted solution) containing chips is supplied and a filtrate tank 41 to which cutting oil (an example of a filtrate) is supplied after filtration and chip removal by the cylindrical filtration filter. The undiluted solution tank 40 and the filtrate tank 41 are partitioned by a wall 42.

The cutting oil filtration device 4 further includes a pair of cylindrical attachment bodies 43. The filter main body 1 is attached to the attachment bodies 43 as described later. One of the attachment bodies 43 is inserted into the wall 42 so as to be rotatable around the central axis thereof. The undiluted solution tank 40 and the filtrate tank 41 communicate with each other through the attachment body 43. The other attachment body 43 is supported on a wall 44 so as to be rotatable around the central axis thereof. The pair of attachment bodies 43 are arranged at an interval in the direction of the central axes such that the central axes thereof coincide with each other. Four connecting bodies 45 are arranged at equal angular intervals around the central axis to connect the pair of attachment bodies 43.

An annular projecting portion 46 is provided on the outer peripheral surface of each of attachment bodies 43.

Figure 4:
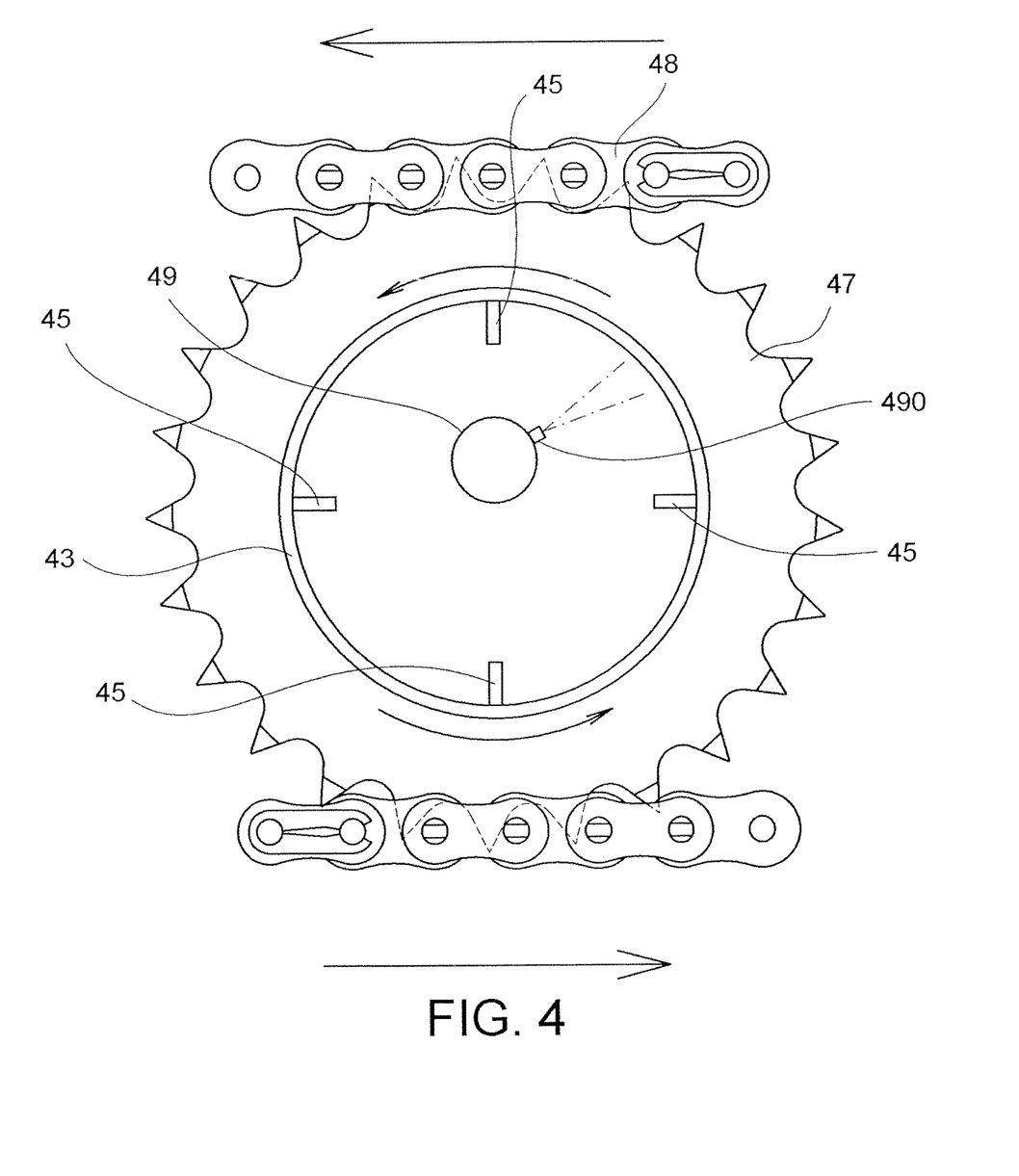
FIG. 4 is a side view illustrating a configuration rotating an attachment body of the cutting oil filtration device illustrated in FIG. 3.

Referring to FIGS. 3 and 4, the cutting oil filtration device 4 further includes gears 47 mounted on the outer peripheral surfaces of attachment bodies 43 and chains 48 engaged with the gears 47. The cutting oil filtration device 4 further includes a drive mechanism (not illustrated) rotating the gears 47 and the attachment bodies 43 by endlessly rotating the chains 48. When attached to the attachment bodies 43 as described later, the filter main body 1 is rotated around the central axis 10 by the drive mechanism.

The cutting oil filtration device 4 further includes a cleaning pipe 49 provided so as to clean the filter main body 1 attached to the attachment bodies 43 from the inside. The cleaning pipe 49 extends along the central axis of the attachment body 43. A plurality of nozzles 490 (FIG. 4) are attached to the cleaning pipe 49 with an appropriate interval in the longitudinal direction thereof. A cleaning solution is supplied to the cleaning pipe 49 and jetted from the nozzles 490.

Attachment of the filter main body 1 will be described below.

Figure 5A:
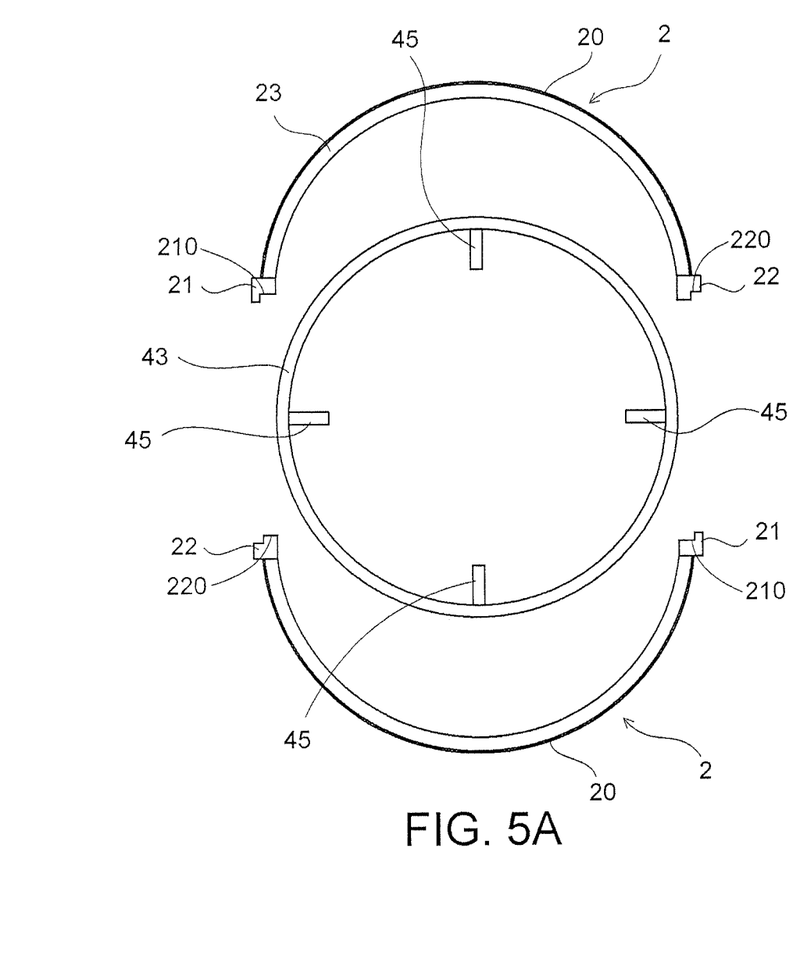
FIGS. 5A and 5B are diagrams illustrating filter main body assembly and attachment.
Figure 5B:
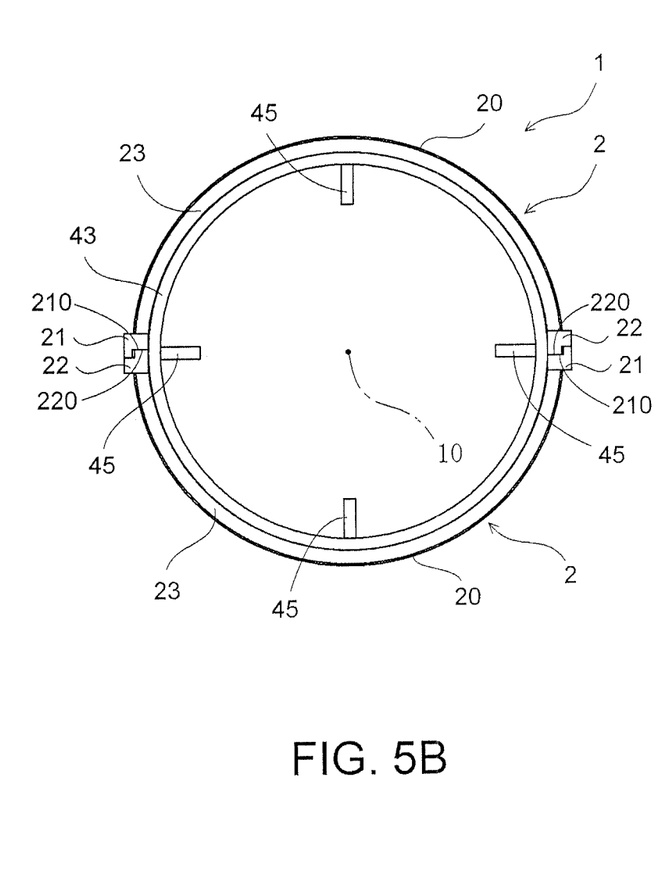

As illustrated in FIG. 5A, the split filters 2 are prepared. Then, as illustrated in FIGS. 5A and 5B, the attachment body 43 is covered with the split filters 2, and the filter main body 1 is assembled into a cylindrical shape from the split filters 2. At this time, in the split filters 2 adjacent to each other, the first facing surface 210 of the first side frame body 21 of one split filter 2 and the second facing surface 220 of the second side frame body 22 of the other split filter 2 are fitted together. In other words, as illustrated most clearly in FIG. 7, the inward facing surface part 2100 and the outward facing surface part 2200 are brought into contact with each other, and the perpendicular surface parts 2101 and the perpendicular surface parts 2201 are brought into contact with each other.

Furthermore, at this time, the projecting portion 46 of the attachment body 43 is inserted into the recessed groove 25 of the end frame body 23 of the split filter 2 as illustrated in FIG. 6A.

Then, as illustrated in FIG. 6B, at least one fastener 3 is prepared. In this embodiment, two fasteners 3 are prepared. The fasteners 3 are attached to both end portions of the filter main body 1 and wound around the outer peripheral surface of the filter main body 1 (the end frame bodies 23 of the split filters 2). The filter main body 1 is therefore fastened by each of the fasteners 3. As a result of the fastening by the fasteners 3, pressure contact occurs between the first facing surface 210 and the second facing surface 220, especially between the inward facing surface part 2100 and the outward facing surface part 2200.

The filter main body 1 is attached to the attachment bodies 43 in this manner.

Then, the cutting oil filtration device 4 rotates the filter main body 1 around the central axis 10 (FIG. 1) by means of the driving mechanism, and the chip-containing cutting oil is filtrated by the filter main body 1 in the undiluted solution tank 40. This is because chips are not capable of passing through the filter element 20 of the filter main body 1 and only cutting oil is capable of passing through the filter element 20. The filtrated cutting oil flows as a filtrate into the filter main body 1. When the filter main body 1 is attached to the attachment bodies 43, the inside of the filter main body 1 communicates with the filtrate tank 41 through the attachment body 43. The filtrated cutting oil therefore flows out into the filtrate tank 41. In this manner, the cutting oil can be reused.

Figure 8:
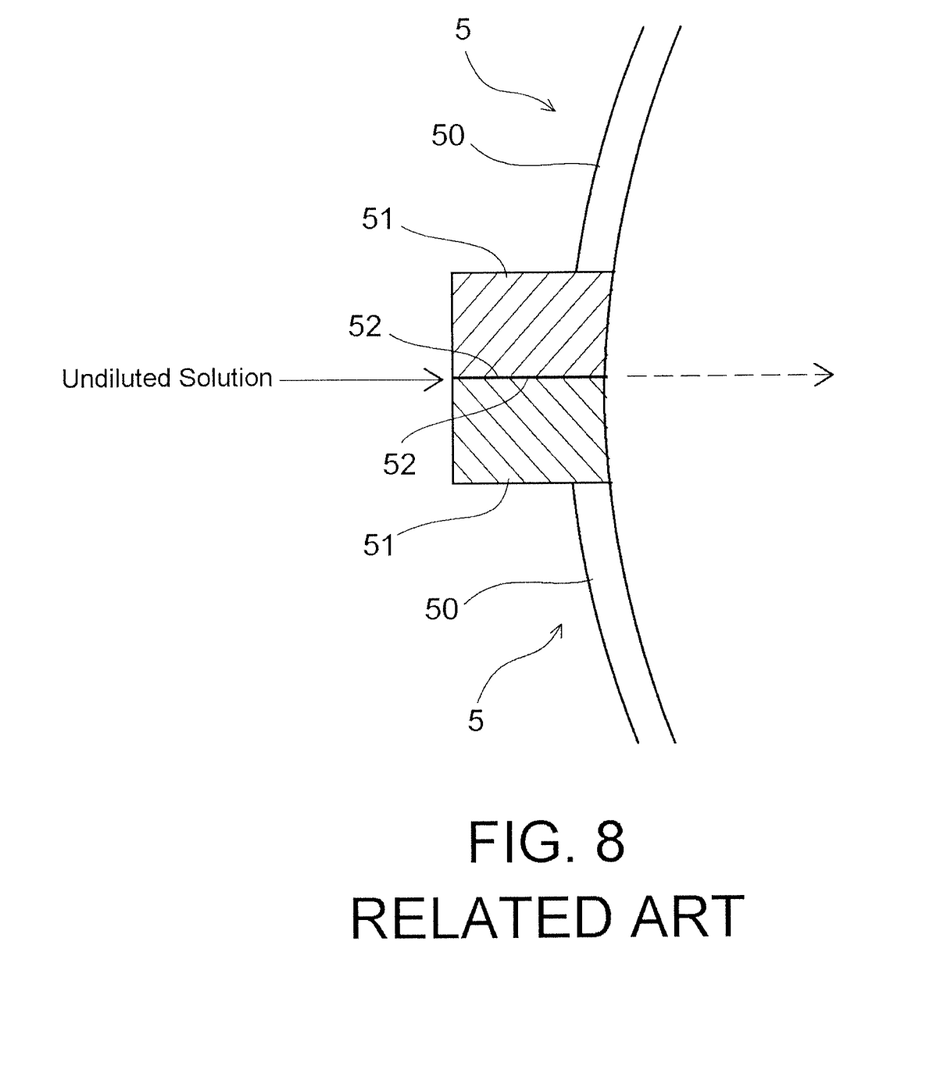
FIG. 8 is a cross-sectional view illustrating an example of an inter-split filter seal structure in a cylindrical filtration filter according to the related art.

FIG. 8 is a partial cross-sectional view of an example of a cylindrical filtration filter having a split structure according to the related art. This cylindrical filtration filter includes two split filters 5 each having a semicircular arc shape in cross section. Each of the split filters 5 includes a filter element 50 such as a wire screen and a side frame body 51 provided along a side portion of the filter element 50. Each of the side frame bodies 51 includes a flat facing surface 52. The cylindrical filtration filter is assembled from the split filters 5 such that the flat facing surfaces 52 of the split filters 5 come into contact with each other.

However, in the configuration simply based on the contact between the flat facing surfaces 52, the sealability between the split filters 5 is very poor. There is a possibility that an undiluted solution passes between the facing surfaces 52 and intrudes into the cylindrical filtration filter without being filtrated.

Figure 7:
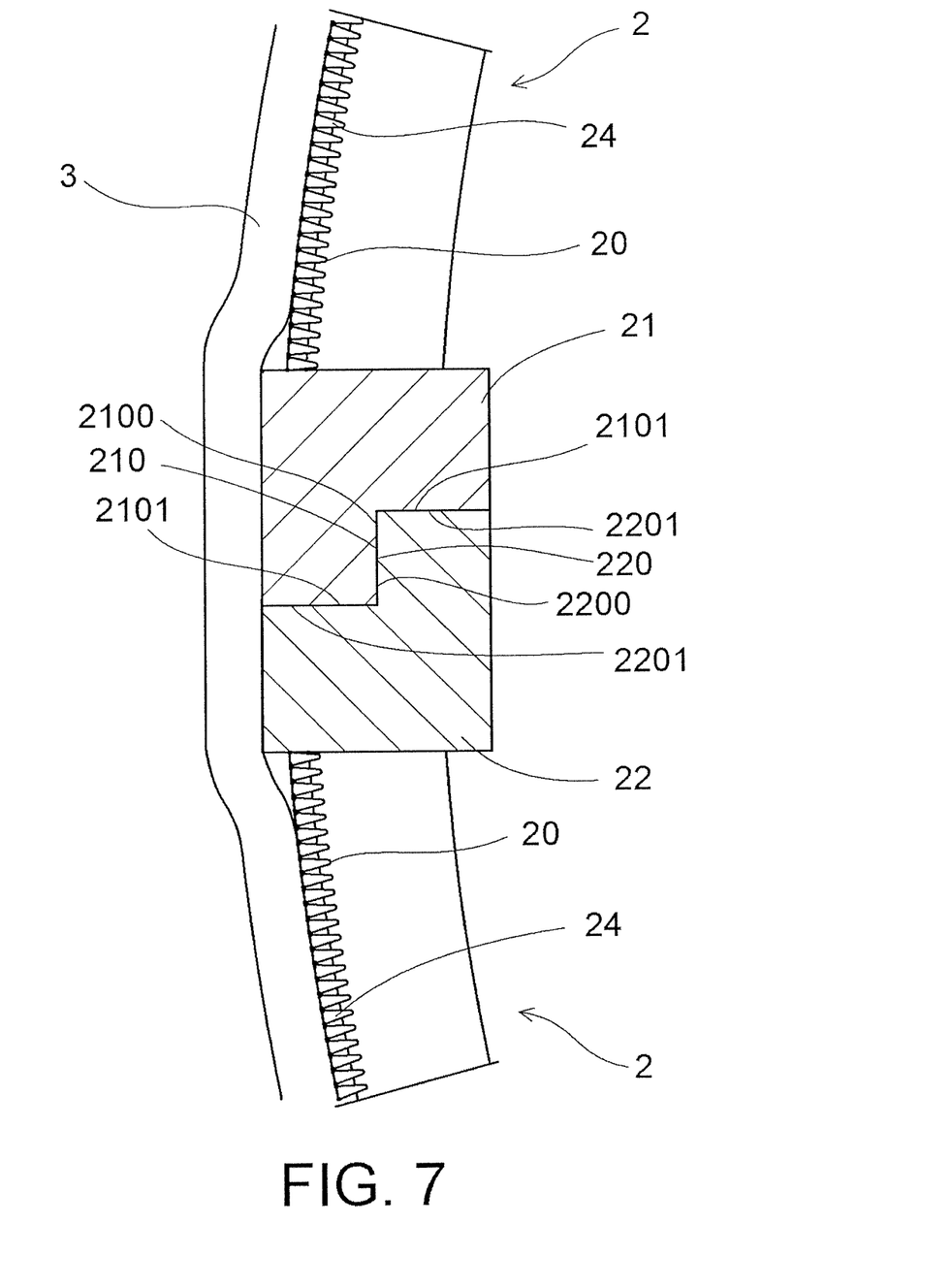
FIG. 7 is a cross-sectional view illustrating an inter-split filter seal structure in the cylindrical filtration filter according to an embodiment of the disclosure.

In contrast, in the split filters 2 adjacent to each other of the cylindrical filtration filter according to the embodiment of the disclosure, the first facing surface 210 of one split filter 2 that has an uneven shape and the second facing surface 220 of the other split filter 2 that has an uneven shape are fitted to each other as illustrated in FIG. 7 when the filter main body 1 is assembled. This fitting between the uneven shapes improves the sealability between the split filters 2 as compared with the configuration illustrated in FIG. 8, in which flat facing surfaces 52 and 52 are brought into contact with each other. As a result, an undiluted solution is prevented from entering the filter main body 1 without being filtrated.

Furthermore, by the filter main body 1 being fastened with the fastener 3, firm pressure contact occurs between the first facing surface 210 of the first side frame body 21 and the second facing surface 220 of the second side frame body 22, especially between the inward facing surface part 2100 and the outward facing surface part 2200. As a result, the sealability between the split filters 2 is further improved.

In a case where the filter element 20 has rigidity as in the wire screen of the embodiment, the fastening force of the fastener 3 provided in the end portion of the filter main body 1 is transmitted over the entire longitudinal direction of the first side frame body 21 and the second side frame body 22 because of the rigidity of the filter element 20. The sealability between the split filters 2 is therefore excellent over the entire longitudinal direction.

As illustrated in FIG. 6A, the deviation of the filter main body 1 in the direction of the central axis 10 with respect to the attachment body 43 is suppressed by the recessed groove 25 of the split filter 2 and the projecting portion 46 of the attachment body 43. This is highly effective when no connecting body 45 (FIG. 3) is provided unlike in the embodiment. This is because the filter main body 1 may deviate in the direction of the central axis 10 and fall off from one attachment body 43 in a case where no connecting body 45 is provided but the filter main body 1 is prevented from falling off by the recessed groove 25 and the projecting portion 46.

In the above embodiment, the cylindrical filtration filter is used for cutting oil filtration, but the cylindrical filtration filter may be used for other purposes.

In the above embodiment, each of the two split filters 2 includes the first side frame body 21 and the second side frame body 22. Alternatively, one split filter 2 may includes two first side frame bodies 21 extending along both side portions thereof and the other split filter 2 may includes two second side frame bodies 22 extending along both side portions thereof.

Instead of the above embodiment, the filter main body 1 may be constituted by three or more split filters each having an arc shape in cross section.

The uneven shape of the first facing surface of the first side frame body 21 and the uneven shape of the second facing surface of the second side frame body 22 are not limited to the above embodiment. Other uneven shapes may be adopted instead.

The filter element 20 of the split filter 2 may be another filter element such as a punching metal instead of the wire screen. From the viewpoint of improving the sealability between the split filters 2 as described above, it is preferable that the filter element 20 has rigidity.

The fastener 3 may be, for example, a wire band instead of the hose band.

Although the cutting oil filtration device 4 has both the connecting body 45 and the projecting portion 46 in the above embodiment, the connecting body 45 and the projecting portion 46 do not have to be provided together. This is because, if either one is provided, the filter main body 1 is prevented from deviating in the direction of the central axis 10 and falling off from one of attachment bodies 43.

Although the foregoing description is directed to the preferred embodiments of the disclosure, it is noted that other variations and modifications will be apparent to those skilled in the art, and may be made without departing from the spirit or scope of the disclosure.

What is claimed is:

1. A cylindrical filtration filter comprising:
   a cylindrical filter main body constituted by at least two split filters each having an arc shape in cross section, each of the at least two split filters including:
      a filter element for filtration; and
      side frame bodies provided along side portions of the filter element,
   wherein:
   the side frame body of one of two split filters adjacent to each other among the at least two split filters includes a first facing surface having an uneven shape and the side frame body of the other of the two split filters includes a second facing surface having an uneven shape complementary to the first facing surface; and
   the first facing surface and the second facing surface are fitted to each other when the filter main body is assembled.

2. The cylindrical filtration filter according to claim 1, wherein:
   the first facing surface of one of the two split filters includes an inward facing surface part facing an inside of one of the two split filters;
   the second facing surface of the other of the two split filters includes an outward facing surface part facing an outside of the other of the two split filters; and
   the first facing surface and the second facing surface are fitted to each other such that the inward facing surface part and the outward facing surface part are in contact with each other.

3. The cylindrical filtration filter according to claim 2, further comprising a fastener provided along an outer peripheral surface of the filter main body, wherein the inward facing surface part and the outward facing surface part are brought into pressure contact with each other as a result of fastening by the fastener.

4. The cylindrical filtration filter according to claim 3, wherein the fastener is a hose band or a wire band.

5. The cylindrical filtration filter according to claim 1, wherein the filter element is a wire screen.

* * * * *